United States Patent
Cook et al.

(10) Patent No.: US 9,614,689 B2
(45) Date of Patent: Apr. 4, 2017

(54) NETWORK IN-LINE TESTER

(75) Inventors: Thomas Cook, West Lothian (GB); Peter Cronshaw, West Lothian (GB)

(73) Assignee: CALNEX SOLUTIONS LTD, West Lothian (GB)

( * ) Notice: Subject to any disclaimer, the term of this patent is extended or adjusted under 35 U.S.C. 154(b) by 153 days.

(21) Appl. No.: 12/602,579

(22) PCT Filed: Jun. 23, 2008

(86) PCT No.: PCT/GB2008/002155
§ 371 (c)(1),
(2), (4) Date: Dec. 1, 2009

(87) PCT Pub. No.: WO2009/001067
PCT Pub. Date: Dec. 31, 2008

(65) Prior Publication Data
US 2010/0172255 A1    Jul. 8, 2010

(30) Foreign Application Priority Data
Jun. 23, 2007   (GB) .................................. 0712199.9

(51) Int. Cl.
*H04L 12/26* (2006.01)

(52) U.S. Cl.
CPC ...... *H04L 12/2697* (2013.01); *H04L 43/0847* (2013.01); *H04L 43/50* (2013.01)

(58) Field of Classification Search
USPC ....... 370/241, 242, 244, 245, 247, 248, 251, 370/252
See application file for complete search history.

(56) References Cited

U.S. PATENT DOCUMENTS

| 6,233,073 | B1* | 5/2001 | Bowers ................ H04B 10/077 370/244 |
| 6,314,531 | B1 | 11/2001 | Kram |
| 6,442,141 | B1* | 8/2002 | Borella ............... H04L 12/2602 370/248 |
| 6,631,481 | B1 | 10/2003 | Hoard |
| 7,656,796 | B1* | 2/2010 | Ciavattone .................... 370/230 |
| 2002/0039371 | A1* | 4/2002 | Hedayat et al. .............. 370/516 |
| 2007/0115832 | A1* | 5/2007 | Ramalho ............ H04L 43/0829 370/241 |
| 2007/0127389 | A1* | 6/2007 | Klotz .................. H04L 12/2697 370/252 |
| 2007/0223388 | A1* | 9/2007 | Arad ........................ H04L 1/24 370/252 |

FOREIGN PATENT DOCUMENTS

| EP | 1643683 A2 * | 4/2006 |
| EP | 1643683 A2 | 4/2006 |

OTHER PUBLICATIONS

International Search Report for PCT/GB2008/002155, dated Aug. 12, 2008.

* cited by examiner

*Primary Examiner* — Adnan Baig
(74) *Attorney, Agent, or Firm* — Moore & Van Allen PLLC; W. Kevin Ransom

(57) ABSTRACT

An in-line tester (10) for testing a telecommunications network. The tester (10) is connectable in line in a communications channel in the network, between network elements or nodes (12), so that all packets within that channel have to flow through it.

26 Claims, 6 Drawing Sheets

NETWORK IN-LINE TESTER

FIELD OF THE INVENTION

The present invention relates to a network in-line tester. In particular, the present invention relates to a tester that is able to generate real-world test scenarios by manipulating actual packet flows in a telecommunications network without the need to generate such flows.

BACKGROUND OF THE INVENTION

Testing communication networks is very important to ensure reliability and quality of service. Packet blaster systems for doing this, such as shown in FIG. 1, are well known. These have traffic generators and traffic receivers for generating and receiving respectively very large numbers of data flows on multiple interfaces via network elements (NE) in order to test the ability of the system under test (SUT) to carry and manage large numbers of services in the specified manner. By flow is meant all the packets associated with a single customer's data, or multiple customers' data that has been grouped together and labelled with a common header or, more generally, all packets that have the same label in the section of header of interest. The usual outcome of this sort of testing is error-free transfer of each service from source to specified destination. In cases of congestion, this type of test solution can be used to prove that the correct prioritisation of traffic has occurred with the highest priority traffic being carried in preference to low-priority traffic flows.

Packet blaster systems connect at the edge of the SUT and are able to generate packet flows with a large selection of packet structures. These systems can be used to stress test the SUT by generating large numbers of flows and/or varying the bandwidth or rate of generation of each flow. In these test systems, all packet flows received are generated from an instance of the Test Solution. The received flows are used to verify the end-to-end Quality-of-Service (QoS) parameters being achieved under multiple loading situations. Whilst this is valuable, a problem is that if the QoS is not as expected, depending on the source of the issue e.g. problems that occur at the centre of the SUT, packet blaster systems cannot debug or identify the cause. In addition, they are unable to test a new or unsupported packet structure until the packet structure of interest has been implemented as an enhancement to the Test Solution.

Packet blaster systems are designed to replicate and/or emulate equipment positioned at the edge of the telecommunications network for the purpose of testing the network elements. Network emulators are a class of test solution used to emulate networks with the objective of testing network elements to be deployed at the edge of the network, as shown in FIG. 2. These test solutions act as a live network replacing the whole network, i.e. they are designed to test the edge equipment connecting to the network, not the network. Network emulators can operate with multiple flows by receiving multiple signals, identifying the individual flows and re-grouping for retransmission to the end units each of which contains multiple data flows. While it is possible to alter the flows, the complete impact of the network is emulated rather than individual effects and/or intermediate points. These testers always terminate and regenerate all traffic flows in all inputs connected to them. While this enables control of the retransmission of flows, it is done by having to specify all aspects of the output. This is a significant limitation where the relative behaviour of packet flows is impacting the performance.

Another network test solution is the traditional transport tester, which is aimed at testing a single connection having only one transmitter and one receiver. Transport testers primarily offer the capability to fully stress test TDM Framing structure of the signal under test, as well as a limited capability to test packet flows embedded within that structure. Their primary function is the verification of the ability to achieve point-to-point transmission, i.e. the role of the Framing structure and TDM Transport Layer, as well as a limited capability in the packet domain for verifying point-to-point transfers. The principle approach of testing one signal is continued into the packet layer with these test solutions offering testing of a single or small number (<8) of packet flows embedded within the TDM structured signal. Limitations of such traditional testers are, however, their inability to operate with large numbers of packet data flows and to analyse large numbers of packet-flows embedded in a TDM signal, as well as their lack of scalability for analysing multiple signals in parallel.

Another solution adopted when operating with multiple packet flows allows control of the retransmission of each of the flows accurately. However, all the input characteristics are removed by demultiplexing the signal completely. In addition, this solution cannot replicate precise network characteristics of real networks and it cannot handle large numbers of packet flows, as the core engine needs to be replicated for each flow to be adjusted. Furthermore, it is not possible to select not to change any aspect of some packet flows and only adjust those to be tested. All characteristics are impacted as they pass through the tester. It is not possible to change one parameter without impacting other characteristics of the flow.

Another problem with most existing network test systems is that their presence has an impact on the performance of the network that they are trying to measure, or interferes in some way with normal network operation. This means that the robustness of the whole system cannot be assessed. Also, most are positioned in the SUT in place of existing network equipment. When a problem is recognised at the end of a transmission path, the network equipment that recognises the problem needs to signal back to the equipment at the source of the transmission path that a problem has occurred to enable it to invoke its protection process. If this equipment has been replaced with a piece of test instrumentation, then this can be problematic. To address this problem, the test instrument has to be able to recognise and respond to the alarm message to invoke the protection process, requiring the test instrumentation to be programmed with proprietary commands for each manufacturer of network equipment.

SUMMARY OF THE INVENTION

According to one aspect of the present invention there is provided a network in-line tester for testing a telecommunications network, the tester being connectable in line within a communications channel within the network so that all data packets within that channel have to flow through it.

By connecting into a network in the normal communications channel, so that all data packets flow through it, rather than replacing or substituting one or more of the units under test, a full range of tests can be performed, whilst the network remains in tact.

Included in the tester are means for identifying and labelling different flows. This is done ideally by searching for selected packets based on a search on a sub-section of the packet, for example a sub-section of the packet header. This enables the identification and separation of flows, so that for example some are changed and some remain identical to their status on the input. The ability to select some flows to remain unaffected is important, as it is often a requirement to not impact certain flows while testing other flows.

The tester may include means for performing one or more operations on the selected flow/s to simulate real-world effects. The operations may include injecting errors to produce an errored packet, varying the delay experienced by each packet as it passes through the device, changing bits within the packets to communicate an alarm state, and changing management and/or traffic packets in selected flows to appear to be associated with other flows. Combinations of events or operations can be performed to emulate complex real-world effects. For example, injecting a delay profile into the packet flow under test could be done concurrently with injecting error events.

The device may be configured to extract one or more selected characteristics of individual packets and/or a sequence of packets within a packet flow and record these. The recorded characteristics may be used for replay onto another flow to recreate the original situation at a future point in time.

By recording only the characteristic of interest rather than the whole flow and all its characteristics, the amount of storage required to record the characteristic of interest is relatively low. This enables the recording of information over very long periods of time, for example many days, without the need for very large storage devices, which would be impractical in the vast majority of cases.

Recorded characteristics or profiles can be examined and modified prior to being replayed. Alternatively, profiles may be generated within the tester for replay at a later stage. As an example, a delay characteristic or profile may be recorded.

Prior to replay, it is possible to modify the record. For example, where the record is a delay characteristic or profile, this modification includes but is not limited to changing the delay value for individual packets. Other effects can be overlaid on replayed delay profiles. For example, the addition of error events on top of a stressful delay profile could be specified to verify operation of the device under test with real-world complex situation.

The whole record or a sub-section thereof, modified or unmodified, can be replayed onto a completely different packet flow. This replay activity can be performed in any instance of the tester and is not restricted to the one that performed the original recording. For example, where multiple testers are connected to the SUT, characteristics can be recorded in one flow and then replayed using a different tester in a different flow, possibly in a different geographic location. Where one tester records the characteristic, this can then be applied to a tester in a new flow or a different SUT.

Transfer of recorded profiles between different testers may be done in various ways. Where multiple testers are networked, transfer may be via the network connection. Alternatively, the record may be transferred by loading the recorded file into a processor, for example a PC, connected to the tester on which it was recorded and then transferring it using any standard, convenient method, e.g. on a memory stick or as a ftp transfer between PC's, etc. In some cases, a single PC may be used to control or interact with several testers, in which case a record stored from one device could be replayed via the PC on another of the devices to which it is connected.

Means may be provided for time stamping each packet as it arrives. This timestamp remains with the packet as it passes through the tester. This allows the output signal to be reconstructed to be identical to the signal received, or to completely change, e.g. re-order all the packets, change the time-gap between each packet, etc., or any required state in between these two extremes, e.g. some of the packet flows are output in identical fashion to that on the input and some are changed significantly, re-ordered, errored, etc.

The tester of the present invention provides numerous advantages. By examining the sub-section of interest within the packet header without the need to analyse the whole header, it is possible to monitor large numbers of packet flows in a highly efficient manner. It is also possible to categories and record selected characteristics of identified packet flows. By managing multiple packet flows within a single instance of the tester the invention is scalable to very large numbers of flows.

The tester may be adapted to test packet flow in two directions, thereby providing bi-directional testing.

According to another aspect of the invention, there is provided a test system comprising a plurality of testers according to the first aspect of the invention. The system may include means for passing information between the testers and/or means for collecting information from the testers.

The system may be adapted to replay one or more stored characteristics of one or more packets or packet flows on one or more packets or packet flows in another tester. The stored characteristics may be recorded from one or more packets or packet flows at another tester. An advantage of this is that real life characteristics can be injected into packets or sequences of packets as and when desired by the user.

The system may be adapted to monitor or evaluate the impact of an action in one tester on one or more packets or sequences of packets in a downstream tester.

BRIEF DESCRIPTION OF THE DRAWINGS

Various aspects of the present invention will now be described by way of example only with reference to the accompanying drawings, of which.

DETAILED DESCRIPTION OF THE DRAWINGS

Figure 1:
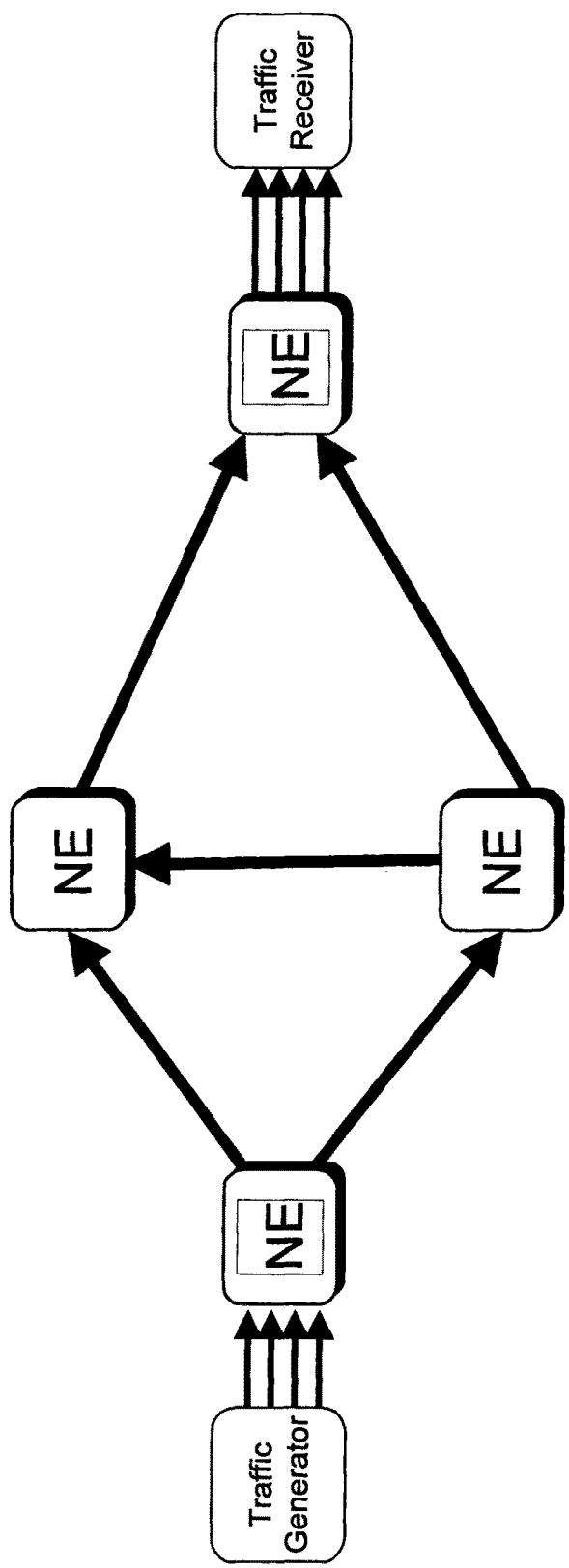
FIG. 1 shows an exemplary network with multiple network elements wherein network traffic is generated through a first network element and network traffic is received through a final network element.
Figure 2:
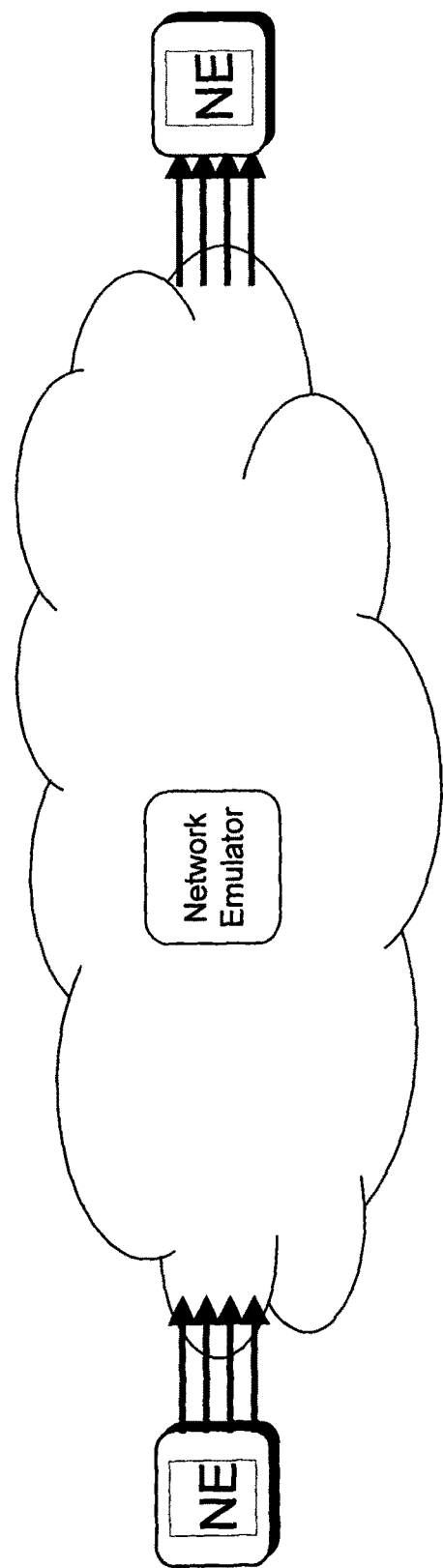
FIG. 2 depicts an exemplary network wherein two or more network elements are connected across a network emulator.
Figure 3:
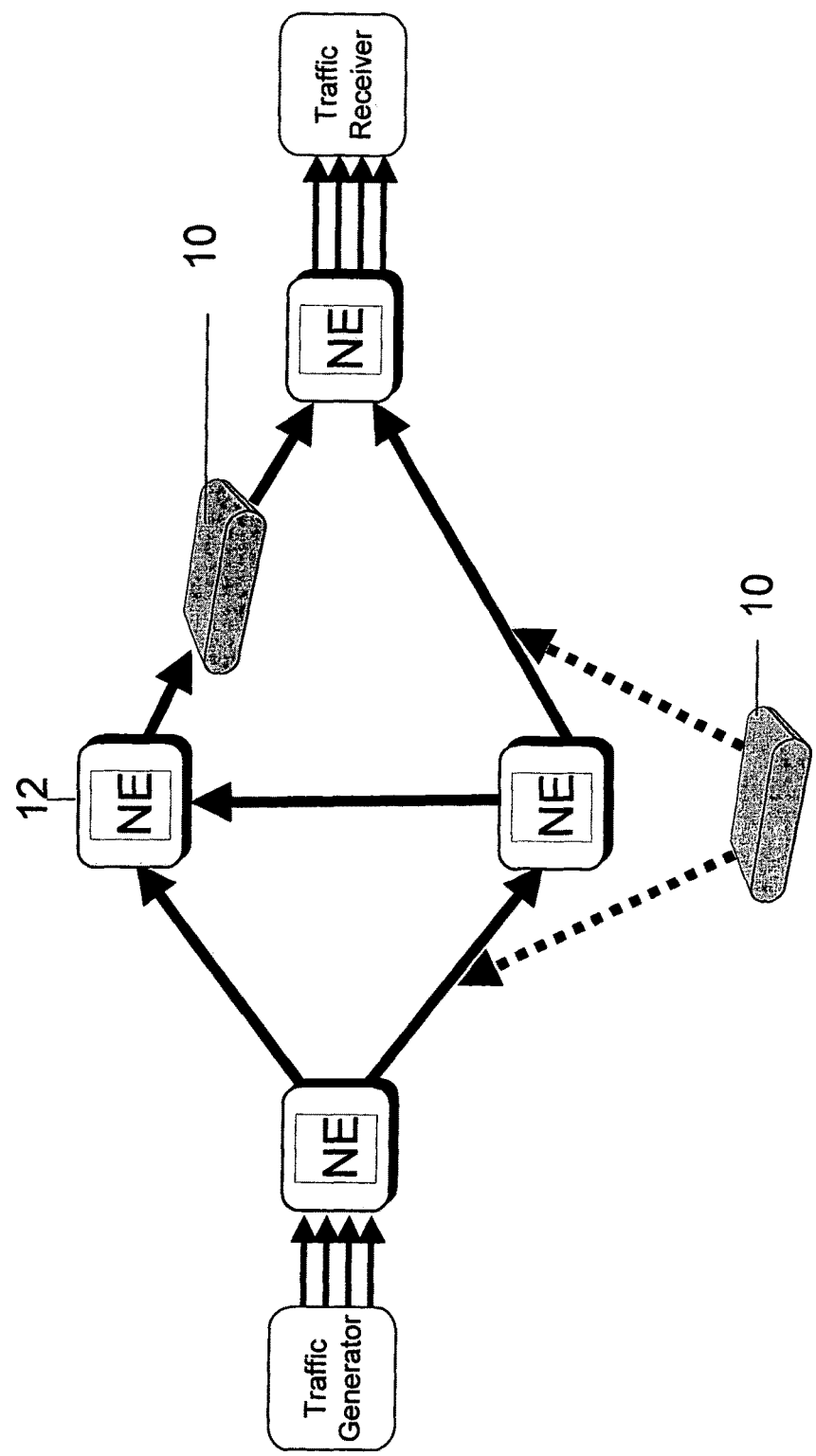
FIG. 3 shows a network with a network in-line tester in accordance with the invention arranged in a tunnel-testing mode.

FIG. 3 shows a telecommunications network with a network in-line tester 10 positioned in the real signal flow path between two network elements or nodes 12, so that all signals passing along that path have to pass through the tester 10. In accordance with the invention, the tester 10 is designed to selectively influence the progress of one or more packet flows as they pass through it, so that the impact of, for example, errors in individual packets and/or multiple flows can be tested in a real world network.

Whilst only a single tester 10 is shown connected in-line, it will be appreciated that multiple devices 10 could be located throughout the network, so that the downstream impact of changes made at one tester can be monitored. In this case, the multiple testers 10 would be connected to allow the sharing or transfer of information between them. Using information from multiple testers 10 allows events to be compared and contrasted across the network, and allows the downstream impact of upstream problems to be measured. Also, the insertion of corruption events can be synchronised, so that their downstream impact can also be monitored. Optionally, a processor (not shown), for example a PC may be provided to control communications between the testers.

Figure 4:
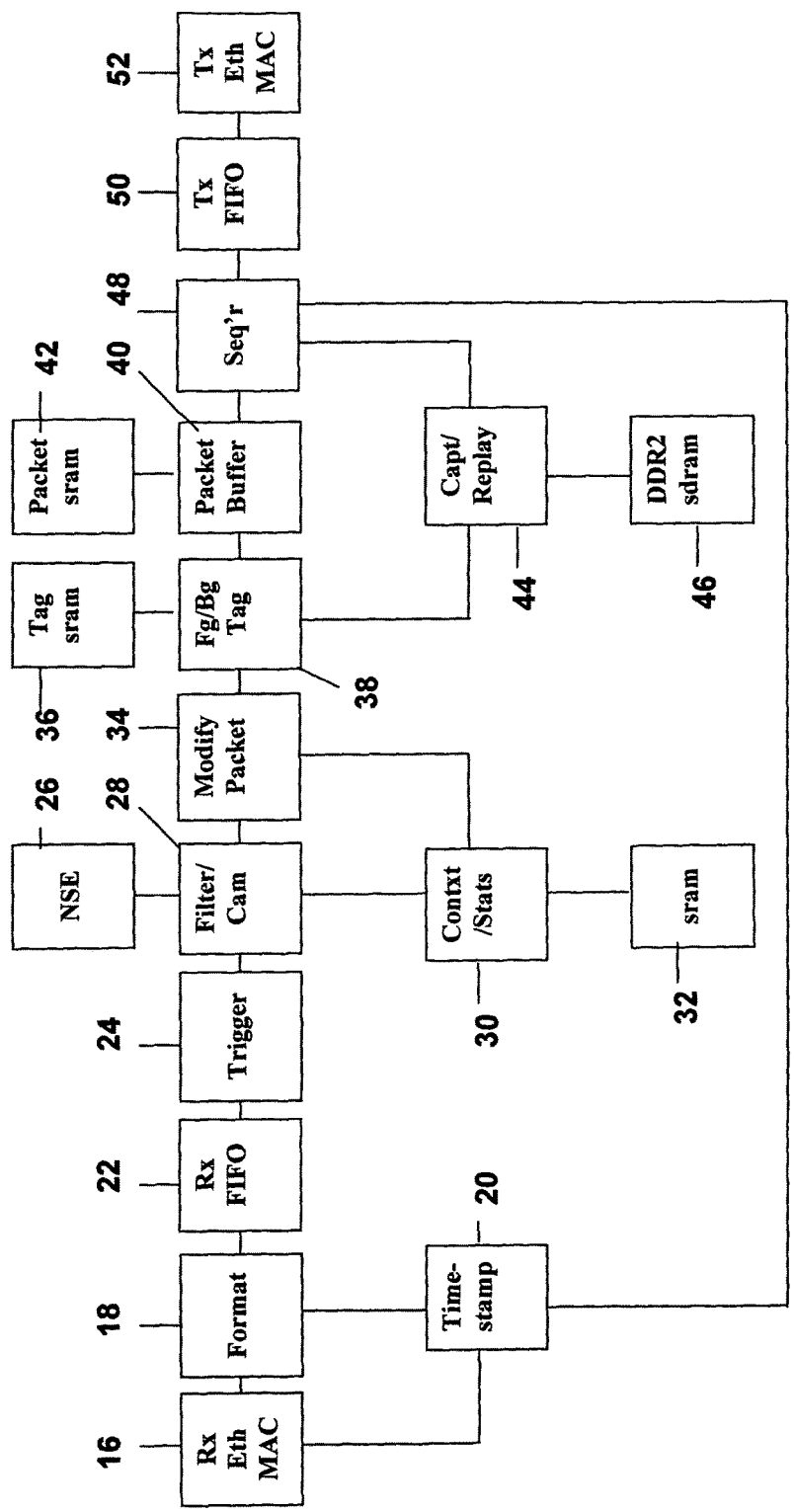
FIG. 4 is a block diagram of the network in-line tester of FIG. 3.

FIG. 4 shows a functional block diagram of an example of the tester 10. In this case, the transmission method is native ethernet. All of the functional blocks of FIG. 4 are implemented in an FPGA, more specifically VHDL, although this is not essential. The tester 10 of FIG. 4 has a Receive Ethernet MAC input block 16 for receiving packets. For other transmission systems, this block 16 would be replaced with the equivalent function, e.g. if the transmission system were SDH, then the outer packet structure would be GFP. The MAC receiver 16 performs an initial frame alignment to the packet structure. It detects and marks the start of packet, removes MAC line encoding, performs a serial to byte wide data conversion resulting in byte-wide data that is byte alignment with the packet format and performs a CRC error check of the MAC frame using the error detection mechanism that is part of the structure. Once this is done, the byte wide data is passed to Format block where it is reformatted into 32-bit wide data. Of course, wider data buses, for example, a 64-bit wide data bus, could be used in other implementations. The packet is then timestamped by the Timestamp function block 20.

The Timestamp block 20 can perform a number of operations. Firstly, it receives a trigger signal from the Tx Ethernet MAC block 16 each time the start of a packet is detected. The Timestamp block 20 records the time at which this trigger is received to create an arrival timestamp for each packet. This becomes one of the tags that accompany the packet as it passes through the instrument 10. The Timestamp block 20 may also introduce a delay by altering the real time of arrival in some way. In one example, an identical delay, of any desired value, is added to every packet. To achieve this, before the arrival timestamps are passed to the other functional blocks, the Timestamp block 20 increments them by an amount that has been configured as the transient delay. For example, if the transient delay is configured to 1 msecond, then each arrival timestamp is altered by an addition function which increments it by 1 msecond. The adjusted value is then the precise time that the packet is transmitted from the instrument. Alternatively or additionally, the Timestamp block 20 can adjust each timestamp by an amount defined in a packet delay variation (PDV) profile. In this case, the Timestamp block performs an addition function on each arrival timestamp with the next value in the PDV profile.

After timestamping, the RX FIFO (first in first out) block 22 passes the packet from the MAC receiver clock domain to the system clock domain. While the frequency of the transmitted signal will be frequency-locked to that being received, the actual clock used to sample the data on the receive input is different to that used by the transmitter to output the data. Therefore, the FIFO buffers are used to avoid problems in transferring the data between clocks.

Connected to the FIFO block 22 is a Trigger block 24 that picks off a selected number of bytes or sub-segments of a packet to generate a trigger word. Target trigger words indicative of packets of interest are set by the user using, for example, the PC interface. The Trigger block 24 uses the generated trigger words and the stored target trigger words in the first stage of packet selection to determine if the flow is a flow of interest. If there is a match between the generated and target words, the packet is identified as a foreground packet and the Trigger block passes it to a Filter/Cam block 26 that co-operates with a network search engine (NSE) 28 to perform the second stage of packet selection. In the second stage, the Filter block searches each packet for a match to a user set pattern, details of which are stored in the NSE 28, together with a mask for each pattern. When there is a match, the flow of interest is identified and separated from other flows. In the event that a match is found, the NSE records each unique value it finds and creates a record for it.

Because the search process uses sub-segments of real received data packets, the tester 10 does not have to be able to decode the whole packet, but instead only on pre-determined segments of interest. This enables all the processing capability of the tester 10 to be focused on the sub-segment of the packet that is of interest. A benefit of this is that the tester 10 can be used with any and all packet structures, without the need for the development of new capability each time a new structure of interest is identified or developed. Instead, the trigger can be based on, for example, a header or portion thereof or any other sub-set of bytes with each bit having a different meaning. In practice, the user needs to understand the meaning of the header of the packet of interest to ensure the correct trigger is set, but the tester 10 does not. This means that the tester 10 can be programmed by the user to handle new packet structures without detailed knowledge of these. Therefore, the user does not have to wait for an up-date from the manufacturer or provider of the tester, but instead he can use it immediately.

Where the flows that are being monitored are tunnels, the tester 10 identifies all the tunnels that are active by creating an entry in the NSE 28 for every unique tunnel address identified. For each address identified, additional information associated with that tunnel is accumulated/collected e.g. the number of packets received associated with that tunnel, if OAM packets are present, etc. The search of locations within the NSE 28 is done in parallel. This means that tens of thousands of patterns can be searched for using the minimum size packet. NSEs 28 are well known in the art and so will not be described in detail. At the end of the search, an indication is sent downstream with the packet to indicate if a match has been found.

Once the packets have been filtered and matched packets identified, details are extracted by the Contxt/Stats (Context and Statistics) block 30 and stored, for example in sram 32. Examples of statistics stored include the number of packets, the length of each, etc. For each packet that is matched with the trigger, context information is stored to tell the downstream functions what to do with the data, for example, to error the packets in this flow and if so for how many packets. This instruction is user configured. The statistics ram address associated with each flow or tunnel identified accumulates/collects additional information associated with each active tunnel, e.g. counts the number of packets received in each tunnel, the total number of data bytes to calculate the tunnel bandwidth, etc. For packets that do not match, no statistics are collected.

After a packet has moved through the Filter block 26, it passes into the Modify Packet block 34 that is used to selectively modify packets by, for example, injecting one or more errors into it. If the context indicates an error should be applied to a packet, it is done in this block. Errored packets can be created by, for example, erroring a bit in the header, the body, the CRC checksum or any combination of the three. For flexibility, one of a selection of error masks can be applied to the packet, the context indicating which should be used. For each bit of the mask, the command can be: set to invert (error), set to zero, set to one or do not modify. Alternatively the CRC can be inverted to inject a packet error. For packets that have been modified to create a different valid packet other than where the CRC has been deliberately inverted, the CRC error detect mechanisms that are part of the packet structure are re-calculated for the modified packet. There is also a BLOCKRAM within this circuit that has a number of buffers each capable of capturing a single OAM packet. The context for a particular packet can request that the packet be stored in one of these buffers. In most cases, each buffer is small and can only store a single OAM packet, but in others, for example, where multiple types of OAM are present, larger stores could be used to hold the different OAM packets that may exist.

Signals from the NSE 28 identify packets as foreground packets, i.e. packets associated with the tunnels selected for test, from background packets, i.e. packets not associated with tunnels selected for test. Each packet is identified at the foreground/background (fg/bg) tag block 36 as being either a foreground packet or background packet. The tag information for each packet is then stored in Tag sram block 38. The packets themselves are stored in either a foreground packet buffer or a background packet buffer 40, both of which are implemented within the same Packet sram block 42.

The stored tag information includes the timestamp, length and address of the associated packet in the packet sram. This tag information is used to control the output sequencing of the packets. A separate list is associated with the foreground and background packets, one containing the foreground tags and a second containing the background tags. This approach enables a single list to be used to manage and manipulate all the foreground packet flows rather than utilising one per packet flow. By positioning the foreground Tag sram block 38 after the Modify Packet block 34, the amount of information that has to be stored is reduced, as there is no need to record instructions as to whether the packet is to be modified as well as the tag information.

Connected to the Fg/Bg Tag block 36 is a Capture/Replay block 44 with an associated DDR2 sdram block 46 where packet information can be stored. The function of this is to record packet information so that a real life example of a delay or PDV profile can be replicated at some point in the future in a controlled and repeatable environment. Also, it allows key aspects of the test environment to be controlled to enable other features of the test signal to be adjusted, which in combination with the delay profile may impact the performance of the equipment under test. Either a complete packet flow can be written into the memory or just the arrival time timestamp and packet header. The processor is allowed shared access to the memory at the same time as data is being stored to the memory. This allows stored information to be transferred to the PC connected to the tester during a long measurement period. This avoids the maximum measurement period being limited by the storage capacity of the on-board memory as once the information has been transferred then the memory can be made available to store future results.

When replaying data, the timestamp information is written into the DDR2 sdram 46 by the processor. For long replay patterns, information in excess of that stored in the DDR2 sdram 46 can be continually streamed from the PC to the tester 10. Replay data from the PC is temporarily stored in order to create a buffer of timestamp data waiting to be used. This ensures that interruptions in the data transfer between the tester and the PC, caused by the multi-processing operating system in the PC, or temporary breaks in connectivity in, for example, a lan or wan network, does not impact the replay patterns being generated out of the tester.

At the output of the Capture/Replay block 44 is a Sequencer (Seq'r) block 48 for determining the output packet sequence. It reads foreground and background tag information, and if in replay mode, replay time information. From this it determines when to schedule packets. For example, in a simple transparent mode, the Sequencer 48 looks at the foreground and background tags to see the time at which the next packet should be transmitted and then schedules that packet to be sent at the correct time. When doing a replay, for example, the Sequencer 48 uses the foreground tag information to find the location and length of the next foreground packet but uses the timestamp from the DDR2 sdram 46 as the foreground timestamp rather than that timestamp in the associated tag.

As described previously, as well as using reply information stored in the Capture/Replay sdram 46, another option for delaying packets involves increasing the timestamp at the output of the Timestamp block 20 the packet moves through the tester. This is done by performing an add operation at the Timestamp block 20 where the delay to be injected is added to the timestamp value recorded when the packet arrived. This has the effect of increasing the time each packet stays in the tester before being retransmitted. The delay added can change for each packet to emulate, for example, a ramping delay function. These two methods provide the capability to either completely replace the time-gap between packets as they pass through the instrument; for example, set the gap to be exactly 1 msecond, or alter the timing to have the resulting gap dependent on both the value added and the original value measurement on the input, for example, set the gap to be 1 msecond greater than when it was received.

The time-gap between a packet and the one preceding it in a packet flow being captured can be defined as;

$$\text{Capture Time-Gap, } C_g[N]=C_{time}[N]-C_{time}[N-1]. \quad (1)$$

where $C_{time}[N]$=Arrival time of packet N and $C_{time}[N-1]$= Arrival time of packet N−1.

The variation from the nominal time-gap is therefore:

$$\text{Captured Time-gap Variation, } V_{cg}[N]=C_g[N]-\text{Nominal Gap[Capture]} \quad (2)$$

Where Nominal Gap[Capture]=Nominal Time-gap between 2 packets in the flow being monitored.

The time-gap between packets in the replayed output can be defined in similar way;

$$\text{Replay Time-Gap, } R_g[N]=R_{time}[N]-R_{time}[N-1] \quad (3)$$

where $R_{time}[N]$=Output time of packet N and $R_{time}[N-1]$= Output time of packet N−1.

The variation from the nominal time-gap is therefore;

$$\text{Replay Time-gap Variation, } V_{cg}[N]=R_g[N]-\text{Nominal Gap[Capture]} \quad (4)$$

where Nominal Gap[Capture]=Nominal Time-gap between 2 packets in the flow being regenerated.

In practice, the nominal rate of the captured flow will always be different from the nominal rate of the replay flow because they come from different sources. While clocks used to generate each source will be a high stability, accurate clock e.g. within ±50 ppm, this difference will always be present i.e. Nominal Gap[Capture]≠Nominal Gap[Replay]. If the Nominal Gap[Capture] was used as the Nominal Gap[Replay], the differences between the two source clocks will lead to the nominal data input rate to the test instrument being greater than or less than the nominal data output rate. Large buffer memories could be used to manage this differential, but eventually, depending of the magnitude of the difference, the size of the memory and the length of time the test is performed for, the instrument's buffer will underflow or overflow. This could lead to a major corruption of the packet flow under test, which would be unacceptable.

To avoid differences in the clocks causing problems, the time-gap profile originally captured can be adjusted to remove the effect of the Nominal Gap differential prior to being replayed. This will ensure that the variation in packet time-gap from the captured flow is identical to the variation in packet time-gap in the flow output from the instrument, i.e.: Cap Time Gap Variation, $V_{cg}[N]$=Replay Time-Gap Variation, $V_{rg}[N]$. The Captured Time-gap Variation is deduced by capturing the arrival time of each packet in the flow of interest. From this data, the Nominal gap between packets can be deduced from the following equation;

$$\text{Nominal Gap[Capture]} = \frac{\text{Arrival Time of Last packet}}{\text{Number of packets received} - 1}$$

With this information, equation (2) can be used to determine the variation time. In order to replay the variation time-gap, it may be necessary to add the Vrg pattern to the nominal gap of the packet flow to which the variation pattern is to be applied. This method of adjusting the nominal rate and maintaining the PDV Profile can also be used to accelerate the testing i.e. by using a considerable shorter Nominal Gap period.

The Nominal Gap [replay] can be determined by the instrument in a number of ways, for example by locking the timing reference within the instrument to the same clock source that is used to synchronise the equipment generating the source packet flow and configuring the tester with service parameters associated with that source, for example bit rate, packet structure option being used, etc. In this case, because the tester 10 timing source is locked to the signal source, then the gap will be identical to that being used by the SUT. Another option involves averaging the packet arrival rate to determine the Nominal Gap. For this to be effective, the packet arrival rate has to be monitored over a relatively long period to ensure that the delay experienced by first and/or last packet in the batch of packets being used by the averaging algorithm can be estimated relatively accurately. This gives an estimate of Nominal Gap[Capture], and so using equation 4, the replay packet gaps can be calculated.

The Sequencer 48 controls the order in which packets are output based on a foreground schedule and background schedule. However, in practice, certain complexities can arise, which may require the schedules to be modified. This may happen if the foreground schedule requires the next foreground packet to be sent after the next background packet, but the next background packet length is such that the foreground packet cannot be sent at the correct time. By analysing the length information stored as a tag with the background packet, the Sequencer 48 makes a decision on whether to allow the background packet to be transmitted first or not. In making this decision, the foreground schedule is given priority. The Sequencer 48 also controls, for example, the swapping of the order in which an adjacent pair of packets was received before transmitting those packets.

Once the Sequencer 48 has determined the desired sequence, the packets are transferred to a Transmitter FIFO block (Tx FIFO) 50. This is used to transfer the packet data from the system clock domain onto the MAC transmitter clock domain and into the Transmitter Ethernet MAC (Tx Eth MAC) block 52, which performs the MAC line encoding, serial to parallel conversion, etc. The packets are then transmitted into the network.

The operation of the tester 10 of FIG. 4 will now be described by way of example. As each packet is received by the Tx Ethernet MAC block 16, the line coding is removed and alignment to the packet structure is achieved, i.e. the start and end of each packet is identified. The signal is then passed from the Tx Ethernet MAC block 16 to the Timestamp block 20. On reception of this signal, a timestamp is created which contains the actual time the packet was received. The packet is then passed to the Trigger block 24 via the Rx FIFO 22 where it is retimed on to the instrument's system clock. In the Trigger block 24, it is identified as either a "foreground" or "background" packet. Foreground packets are the flows of interest and are passed through the remainder of the functional blocks for monitoring and potentially adjustment before re-transmission. All the foreground packets will be examined to some degree, and none, some or all will be modified before re-transmission. Background packets by-pass the majority of the functional blocks and are passed directly to the output Sequencer 48 for re-transmission.

The foreground packets are passed to the Filter/Cam block 26. This analyses the sector of the header selected by the user. Each unique value is identified and logged by the NSE 28. The Filter/Cam block 26 and NSE 28 in conjunction with the Context/Stats block 30, lead to key parameters/ characteristics associated with each unique value being recorded in the sram 32, e.g. number of packets received, total bandwidth, etc. This information is used to provide the user with an overview of activity in the sector of interest of the flows of interest. If the user has configured the tester to change any of the packets before re-transmission e.g. add errors, change values, etc., this is performed in the Modify Packet block 34. This utilises the signals from the Filter/ Cam block 26 and the Context/Stats block 30 to identify the packets to be altered. The packets are then transferred to the foreground buffer awaiting re-transmission. The foreground packets are stored in the Packet sram while their associated tag information is stored in the Tag sram.

If the timing between packets is not to be changed as they pass through the tester, then the arrival timestamp is used to schedule each packet's re-transmission in the same order and with the same inter-packet gap as was received on the input. If the timing is to be altered, then the timestamp associated with each packet has to have its timing adjusted is altered to reflect the required timing.

If, for example, the output timing is to be altered using a captured PDV profile, then the PDV replay feature will be enabled. If an absolute replay is to be performed i.e. the time-gap between packets on the output is to be identical to that defined in the PDV profile, the time-gap timestamps are loaded from the Capture/Replay DDR2 sdram 44 and the timestamps captured as the packets are received are discarded and not used to control the re-transmission times. Before the PDV profile is loaded for replay, it will first be analysed to determine if the nominal gap between packets in the PDV profile is the same as that of the packet flow the replay will affect. If it is not, then the difference in nominal gap is calculated and the values in the PDV profile adjusted to remove this difference. The adjusted PDV profile can then be loaded into the DDR2 SDRAM 46 and applied to the packets by the Sequencer 48.

If, for example, the PDV profile is to be used as a relative change to the time-gaps, then the timestamps loaded into the DDR2 sdram 46 are passed to the Timestamp block where the PDV profile values are added in turn to the timestamps recorded as each packet is received. These adjusted timestamps are then passed to the Sequencer 48 to control the re-transmission of the packets.

The adjustment of timestamps is performed in the software procedures that accompany the design described, and not within the block diagram shown. Implementations of this invention may select to perform the removal of nominal timestamp difference within the hardware or the software.

The Sequencer 48 uses the timestamps it receives to initiate the retransmission of all foreground and background packets. Prior to the packets being output from the tester, they are passed through the Tx Ethernet MAC block 52 where the packet is encoded according to the relevant standards.

The ability to monitor and extract the information of interest is important in an environment where there is a huge amount of information. At any point in the network, only a subset of all the layers of information used to construct a packet is of significance and/or interest to engineers testing the system. Only the sections of the packets that are actually being used to transport the traffic across the sector of interest needs to be analysed and/or tested. Therefore, the ability to capture, filter and display the information of interest is vital to ensure the engineer does not have to manually separate the data, which would take considerable time and in many cases, prove impractical. In addition, the ability to record real-world characteristics is very important to allow these to be used in a laboratory environment. It is well recognised across the industry that packet-based networks are extremely difficult, if not impossible, to model to enable simulations to be produced. The ability to record real-life situations and then replay these in the laboratory environment is therefore valuable to enable engineers to prove that the SUT will perform as specified under all real-world situations.

Figure 5:
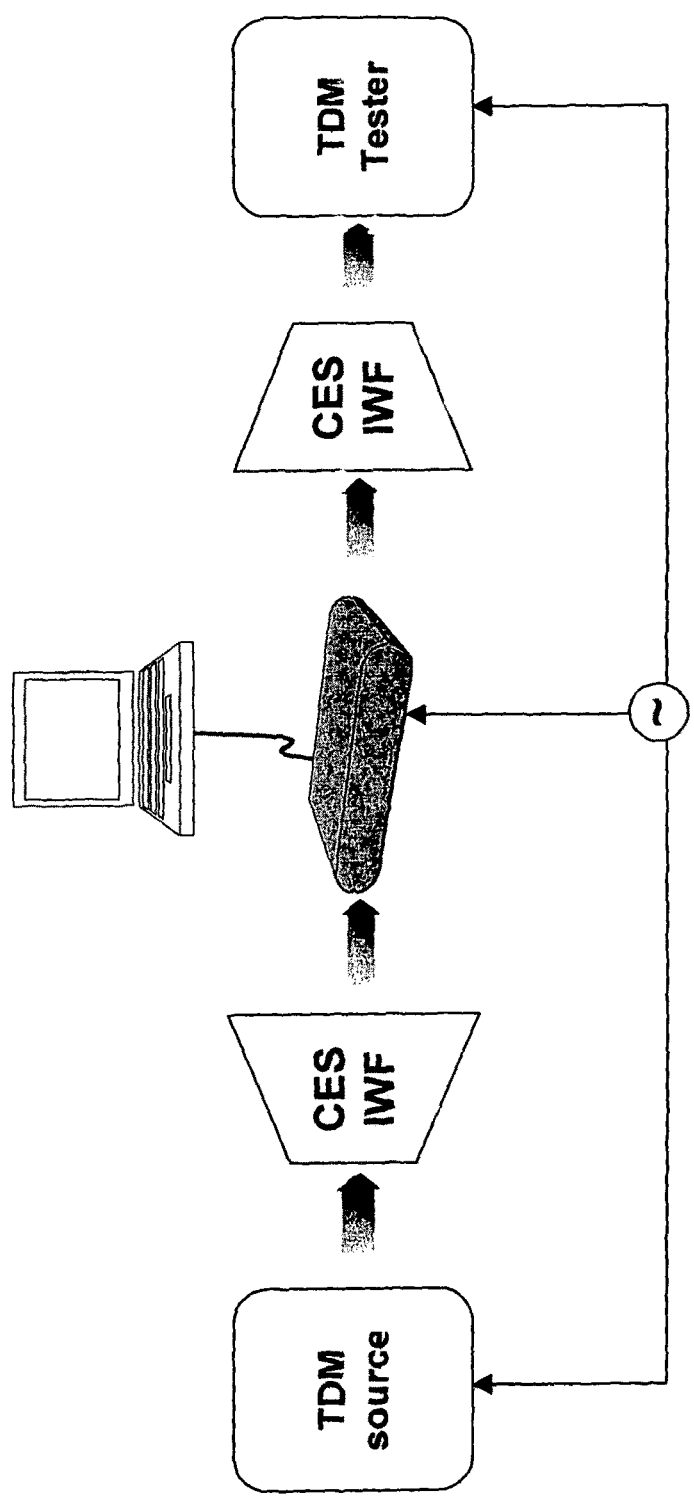
FIG. 5 shows a network with a network in-line tester in accordance with the invention arranged in a Circuit Emulation of a Service (CES) test mode.

A skilled person will appreciate that variations of the disclosed arrangements are possible without departing from the invention. For example although the tester is shown in FIG. 3 in a tunnel-testing mode, it could equally be used in other modes, for example a CES test mode, as shown in FIG. 5. In another variation, the invention could be used to monitor and/or introduce disruptive events into a service that has two directions of transfer, e.g. into the east-west path (Connection A) and into the west-east path (Connection B). This could be accomplished using two instances of the design described with reference to FIG. 3. An alternative approach is to utilise the one instance and replicate only the input and output sections of the design.

Figure 6:
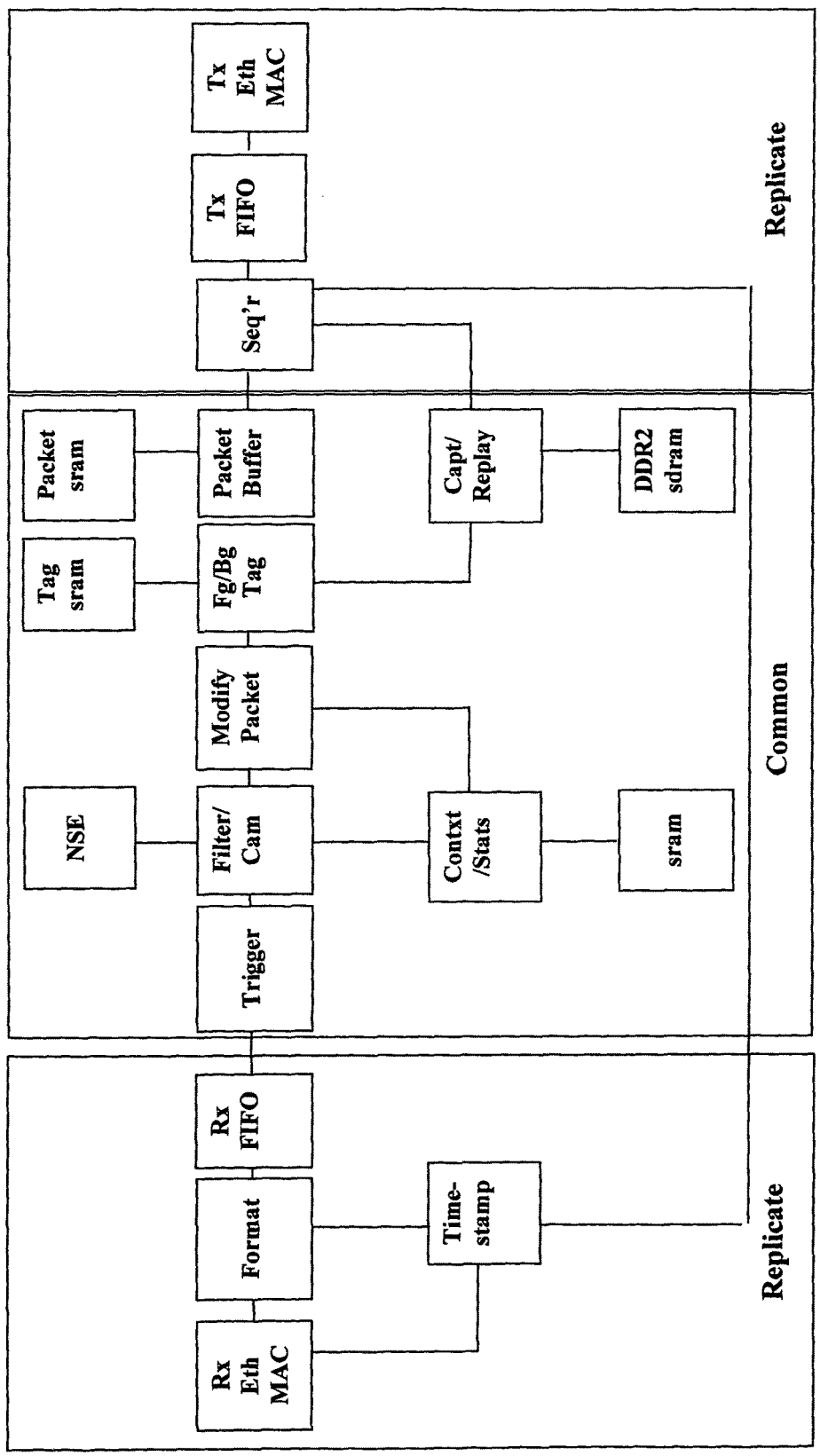
FIG. 6 shows a network in-line tester arranged to allow bi-directional flow testing.

FIG. 6 shows a system for dual-direction testing using a single instance of the tester of the invention. Most of the common functional blocks at the input and output of the design, marked as 'Replicate' on FIG. 6 need to be repeated for each path. The input block for each path works identically to that described earlier, except an additional bit, or label, is assigned to each packet to indicate which connection the packet is associated with e.g. a Path Label will indicate if the packet is associated with the Connection A or Connection B. The output blocks also work as described earlier, except that the connection label is used to determine which packets are associated with a particular connection.

The central section of the block diagram is common to both data paths, although each block requires a minor enhancement to be able to respond to the status of the Path Label. For example, the trigger block will use one set of trigger labels for Connection A and a different set for Connection B. As a second example, the Contxt/Stat block will replicate the registers being used to register the information being gathered, one set for Connection A and one for Connection B.

This concept can be easily expanded to provide the ability to operate with multiple connections in parallel. For each connection, an instance of the blocks marked with 'Replicate' on FIG. 6 has to be implemented but all connections can be combined to pass through the instrument in parallel. This represents an efficient implementation, as well as expandable product architecture. Multiple connections could be from multiple physical connections, or in the case of a signal structure that multiplexes multiple separate connections together, for example SDH or Sonet structures, which create Virtual Containers, these multiple connections could be multiple Virtual Containers.

Accordingly the above description of the specific embodiment is made by way of example only and not for the purposes of limitation. It will be clear to the skilled person that minor modifications may be made without significant changes to the operation described.

The invention claimed is:

1. A network in-line tester for testing a telecommunications network, the tester configured for connection in line in a communications channel in the network so that all packets within that channel have to flow through the tester, wherein the tester is adapted to perform at least one operation on at least one selected packet flow as it flows through the tester, wherein said tester comprises one or more processors and/or circuits configured to: vary the selected packet flow by replaying at least one characteristic or profile recorded from a real communication signal in a different flow on the selected packet flow as the selected packet flow flows through the tester to replicate the characteristics of interest on the selected packet flow, wherein the at least one recorded characteristic or profile comprises a delay characteristic or delay profile and varying the selected packet flow by said tester involves varying relative timings of packets in the packet flow using the recorded delay characteristic or profile thereby simulating real-world time delay effects on the telecommunications network; output the varied selected packet flow via an output of the tester into the communication channel.

2. A tester as claimed in claim 1, wherein one or more processors and/or circuits is configured to identify and label individual packets or sequences of packets in the packet flow.

3. A tester as claimed in claim 1, wherein one or more processors and/or circuits is configured to select at least one packet or packet flow depending on at least one pre-determined criteria.

4. A tester as claimed in claim 3 wherein at least one pre-determined criteria is user selected.

5. A tester as claimed in claim 3 wherein the at least one pre-determined criteria is a sub-segment of each packet.

6. A tester as claimed in claim 5 wherein the sub-segment is a portion of the packet header.

7. A tester as claimed in claim 1 wherein the characteristic or profile is recorded from a real communication signal in a different flow in a different geographic location.

8. A tester as claimed in claim 1, wherein one or more processors and/or circuits is configured to modify the recorded characteristic or profile.

9. A tester as claimed in claim 1, wherein the at least one operation includes at least one of: injecting errors into packets; varying a delay experienced by a packet as it passes through the tester; injecting a delay profile into the packet flow; changing bits within the packets to communicate an alarm state; changing management and/or traffic packets in selected flows to appear to be associated with other flows.

10. A tester as claimed in claim 9, wherein one or more processors and/or circuits is configured to inject a delay profile into the packet flow under test concurrently with injecting error events.

11. A tester as claimed in claim 1, wherein one or more processors and/or circuits is configured for time stamping each packet as it arrives.

12. A tester as claimed in claim 11 wherein the timestamp remains with the packet as it passes through the tester.

13. A tester as claimed in claim 11, wherein one or more processors and/or circuits is operable to use the timestamp to reconstruct at least one packet at an output to be identical to the received packet.

14. A tester as claimed in claim 11, wherein one or more processors and/or circuits is operable to use the timestamp to change the timing of at least one of the packets.

15. A tester as claimed in claim 14, wherein one or more processors and/or circuits is adapted to change the timing by doing at least one of re-ordering the packets and changing the time-gap between packets.

16. A tester as claimed in claim 1, wherein one or more processors and/or circuits is adapted to allow one or more packets or flows to pass through it unaffected.

17. A tester as claimed in claim 1 comprising means for storing selected characteristics of selected packet flows.

18. A tester as claimed in claim 1, wherein one or more processors and/or circuits is adapted to test packet flow in two directions.

19. A tester as claimed claim 1 comprising a clock that is synchronised with a clock in a network transmit source.

20. A test system comprising a plurality of testers as claimed in claim 1.

21. A test system as claimed in claim 20 comprising means for passing information between the testers.

22. A test system as claimed in claim 20, wherein one of the testers is configured to change a packet flow and another is configured to monitor the impact of the changes made.

23. A test system as claimed in claim 20 comprising means for collecting information from a plurality of the testers.

24. A test system as claimed in claim 20 comprising one or more processors and/or circuits adapted to replay of one or more stored characteristics of one or more packet flows on one or more packet flows in a tester.

25. A test system as claimed in claim 24 wherein the stored characteristic is a recorded version of one or more real packet flows.

26. A test system as claimed in claim 20 comprising one or more processors and/or circuits adapted to monitor or evaluate the impact of an action in one tester on one or more packets or sequences of packets in a downstream tester.

* * * * *